United States Patent
Stanton et al.

(10) Patent No.: US 10,324,360 B2
(45) Date of Patent: Jun. 18, 2019

(54) CAMERA RIG

(71) Applicants: Jared Stanton, New Orleans, LA (US); Michael Krikorian, New Orleans, LA (US)

(72) Inventors: Jared Stanton, New Orleans, LA (US); Michael Krikorian, New Orleans, LA (US)

(*) Notice: Subject to any disclaimer, the term of this patent is extended or adjusted under 35 U.S.C. 154(b) by 0 days.

(21) Appl. No.: 15/974,644

(22) Filed: May 8, 2018

(65) Prior Publication Data

US 2018/0329280 A1 Nov. 15, 2018

Related U.S. Application Data

(60) Provisional application No. 62/503,705, filed on May 9, 2017.

(51) Int. Cl.
| | |
|---|---|
| *G01J 3/04* | (2006.01) |
| *G03B 9/08* | (2006.01) |
| *G03B 9/10* | (2006.01) |
| *G03B 9/14* | (2006.01) |
| *G03B 9/18* | (2006.01) |
| *F16M 11/06* | (2006.01) |
| *F16M 11/20* | (2006.01) |
| *G03B 17/56* | (2006.01) |

(52) U.S. Cl.
CPC .......... *G03B 17/561* (2013.01); *F16M 11/06* (2013.01); *F16M 11/2007* (2013.01); *G03B 17/568* (2013.01); *G01J 3/04* (2013.01); *G03B 9/08* (2013.01); *G03B 9/10* (2013.01); *G03B 9/14* (2013.01); *G03B 9/18* (2013.01)

(58) Field of Classification Search
CPC .................................................... F16M 11/06
USPC ............................................................ 396/483
See application file for complete search history.

(56) References Cited

U.S. PATENT DOCUMENTS

| | | | |
|---|---|---|---|
| 6,788,333 B1 * | 9/2004 | Uyttendaele | H04N 5/23238 348/36 |
| 7,948,515 B1 * | 5/2011 | Hines | G03B 35/08 348/47 |
| 8,678,680 B1 * | 3/2014 | Pelini | F16M 11/06 224/275 |
| 8,811,812 B1 * | 8/2014 | Lawler | G03B 17/561 224/482 |

(Continued)

*Primary Examiner* — Clayton E. LaBalle
*Assistant Examiner* — Kevin C Butler
(74) *Attorney, Agent, or Firm* — Asgaard Patent Services, LLC; F. Wayne Thompson, Jr.

(57) ABSTRACT

Implementations of a camera rig configured for use in the production of virtual reality (VR) content are provided. In some implementations, the camera rig may be configured so that multiple cameras can be mounted thereon, each mounted camera faces away from the camera rig and provides a different field of view. In some implementations, the camera rig may be configured so that cameras mounted thereon are able to capture a scene (e.g., a surgical site) from the perspective of a subject (e.g., a surgeon), without obstructing the subject's view of the scene. In some implementations, the camera rig may comprise a first planar member and a second planar member connected together by a first angled bracket and a second angled bracket, each angled bracket includes a connector that is configured for use in orienting and/or positioning the camera rig over the scene (e.g., a surgical site) to-be recorded.

14 Claims, 9 Drawing Sheets

(56) References Cited

U.S. PATENT DOCUMENTS

| | | | |
|---|---|---|---|
| 9,354,504 B1 * | 5/2016 | Park, II | H04N 13/0239 |
| 9,575,394 B1 * | 2/2017 | Wallace | H04N 5/2252 |
| D788,208 S * | 5/2017 | Muhlenkamp, IV | D16/200 |
| 9,690,166 B1 * | 6/2017 | Sanders | G03B 3/00 |
| 9,851,623 B2 * | 12/2017 | Macmillan | G03B 37/04 |
| 9,921,464 B1 * | 3/2018 | Choi | G02B 27/64 |
| 2005/0161560 A1 * | 7/2005 | Kjellman | F16M 11/16 |
| | | | 248/163.1 |
| 2009/0296212 A1 * | 12/2009 | Routhier | G03B 17/56 |
| | | | 359/477 |
| 2009/0323121 A1 * | 12/2009 | Valkenburg | G01B 11/002 |
| | | | 358/1.18 |
| 2011/0129210 A1 * | 6/2011 | McGucken | F16M 13/02 |
| | | | 396/422 |
| 2011/0249963 A1 * | 10/2011 | Cramer | F16M 11/041 |
| | | | 396/325 |
| 2014/0104378 A1 * | 4/2014 | Kauff | H04N 5/247 |
| | | | 348/38 |
| 2014/0260823 A1 * | 9/2014 | Huggins | B25B 13/5091 |
| | | | 81/121.1 |
| 2014/0267596 A1 * | 9/2014 | Geerds | H04N 5/2252 |
| | | | 348/38 |
| 2015/0288858 A1 * | 10/2015 | Fee | F16M 13/04 |
| | | | 348/376 |
| 2015/0316837 A1 * | 11/2015 | Maltese | F16M 13/04 |
| | | | 294/139 |
| 2015/0341617 A1 * | 11/2015 | Cole | G03B 17/561 |
| | | | 348/36 |
| 2016/0028950 A1 * | 1/2016 | Perazzi | H04N 5/23238 |
| | | | 348/38 |
| 2016/0100154 A1 * | 4/2016 | Ghyme | H04N 13/282 |
| | | | 348/48 |
| 2016/0286098 A1 * | 9/2016 | Rappaport | H04N 5/2251 |
| 2016/0344999 A1 * | 11/2016 | Lajeunesse | H04N 5/23238 |
| 2016/0352982 A1 * | 12/2016 | Weaver | H04N 5/23238 |
| 2017/0293206 A1 * | 10/2017 | Wood | G03B 17/561 |
| 2018/0040164 A1 * | 2/2018 | Newman | G09G 3/2092 |
| 2018/0046067 A1 * | 2/2018 | Roots | G03B 17/561 |
| 2018/0063507 A1 * | 3/2018 | Van Lieu | H04N 13/239 |
| 2018/0084257 A1 * | 3/2018 | Abbas | H04N 19/176 |
| 2018/0191959 A1 * | 7/2018 | Neufeldt | H04N 5/23267 |
| 2018/0210322 A1 * | 7/2018 | Malukhin | G03B 17/561 |

* cited by examiner

CAMERA RIG

CROSS REFERENCE TO RELATED APPLICATION

This application claims the benefit of U.S. Provisional Application Ser. No. 62/503,705, which was filed on May 9, 2017, and is incorporated herein by reference in its entirety.

TECHNICAL FIELD

This disclosure relates to implementations of a camera rig.

BACKGROUND

Virtual reality (VR) content may be generated using recorded camera footage of a target scene. Footage used to create VR content may be generated using one or more cameras that are positioned to capture a subject's view of the target scene.

A single camera positioned to the periphery of a scene, being recorded for the generation of VR content, does not accurately capture the subject's perspective, or field of view, of the scene. This limits the overall educational benefit of the recorded scene, thereby diminishing the value of any VR content created therefrom. Further, if the camera were positioned to accurately capture the subject's perspective, the camera may obstruct the subject's view of the scene. This may hinder, or prevent, the subject from performing any task at the scene during recording.

Mounting a camera to the subject's body (e.g., the head) may allow for the camera to accurately capture the subject's perspective of the scene. However, mounting a camera to the subject's body has shortcomings when it is being done to generate VR content. First, the movement of the subject's body will be recorded by the camera. This can lead to a viewer of subsequently generated VR content experiencing motion sickness. Second, the use of a single camera limits the resolution, and causes distortion, of the recorded scene.

Positioning multiple cameras (e.g., six or seven) about the subject will more accurately capture the scene being filmed, while minimizing the distortion thereof. Unfortunately, the prior art does not offer a device that effectively positions multiple cameras about a subject, without obstructing their view, for the purpose of capturing their work at a target scene being recorded.

Accordingly, it can be seen that needs exist for the camera rig disclosed herein. It is to the provision of a camera rig configured to address these needs, and others, that the present invention in primarily directed.

SUMMARY OF THE INVENTION

Implementations of a camera rig are provided. In some implementations, the camera rig may be configured for use in the production of virtual reality (VR) content. In some implementations, the camera rig may be configured so that multiple cameras can be mounted thereon, each mounted camera faces away from the camera rig and provides a different field of view. In some implementations, the camera rig may be configured so that cameras mounted thereon are able to capture a scene (e.g., a surgical site) from the perspective of a subject (e.g., a surgeon), without obstructing the subject's view of the scene.

In some implementations, the camera rig may comprise a first planar member and a second planar member connected together by a first angled bracket and a second angled bracket, each angled bracket includes a connector that is configured for use in orienting and/or positioning the camera rig over the scene (e.g., a surgical site) to-be recorded by cameras mounted on the camera rig. In some implementations, the first planar member and/or the second planar member of the camera rig is configured so that one or more camera mounts can be used to removably secure one or more cameras thereon. In this way, multiple cameras may be positioned on the camera rig to capture video (or pictures) used in the production of virtual reality (VR) content.

In some implementations, the first planar member may comprise a first side and a second side, the first side and/or the second side may be configured for one or more camera mounts to be secured thereto. In some implementations, each side of the first planar member may be flat. In this way, the working face of a suction cup may be used to secure a camera mount to either side of the first planar member.

In some implementations, the first planar member may further comprise a rectangular cutout therein. In some implementations, the cutout may be defined by a first side edge, a second side edge, and a third side edge. In some implementations, the second side edge and the third side edge may extend from a first end and a second end, respectively, of the first side edge. In some implementations, the cutout may be configured (e.g., shaped, dimensioned, etc.) so that the subject can move their head in-between, and/or position their head between, the side edges thereof. In some implementations, the cutout may be configured (e.g., positioned, shaped, dimensioned, etc.) so that the subject has an unobstructed view of at least a portion of the scene being filmed by the cameras mounted on the camera rig.

In some implementations, one or more edges of the first planar member may include a visual indicator thereon. In this way, the subject may easily see the one or more edges of the otherwise transparent first planar member and avoid colliding therewith. In some implementations, a visual indicator may be a strip of tape and/or rubber that is affixed to one or more edges of the first planar member. In some implementations, the visual indicator may be paint that is applied to one or more edges of the first planar member and/or to other portions of the first planar member located adjacent the one or more edges.

In some implementations, the second planar member may comprise a first side and a second side, the first side and/or the second side may be configured for one or more camera mounts to be secured thereto. In some implementations, each side of the second planar member may be flat. In this way, the working face of a suction cup may be used to secure a camera mount to either side of the second planar member.

In some implementations, the first planar member and the second planar member may be fabricated from a transparent material such as acrylic glass (i.e., Poly(methyl methacrylate)). In this way, the camera rig may not obstruct the view of the subject.

In some implementations, the angled brackets may be configured (e.g., bent, fabricated, etc.) to position the second planar member at an obtuse angle relative to the first side of the first planar member. In some implementations, the angled brackets may be configured (e.g., bent, fabricated, etc.) to position the second planar member at a right angle relative to the first side of the first planar member.

In some implementations, the connectors may be configured to secure the camera rig to the arm of a C-stand. In some implementations, the connectors may be configured so that the camera rig can be rotated about a C-stand arm prior to being secured thereon. In this way, the camera rig may be oriented and/or positioned over the scene (e.g., a surgical site) to-be recorded by the cameras mounted on the camera rig.

In some implementations, each connector may comprise a housing having a longitudinally extending cylindrical bore therethrough. In this way, the connectors may be able to rotate about the C-stand arm. In some implementations, the cylindrical bore of each connector may be configured to allow at least a portion of a C-stand arm to pass therethrough. In some implementations, the cylindrical bore of the first connector may be in axial alignment with the cylindrical bore of the second connector. In this way, a single C-stand arm may extend into and/or through both connectors simultaneously.

In some implementations, the connectors may be configured to secure the camera rig to a length of conduit. In some implementations, the connectors may be configured to secure a camera rig to any support structure suitable for positioning the camera rig so that cameras mounted thereon are able to record the scene (e.g., a surgical site) from the perspective of the subject, without obstructing the subject's view of the scene.

DETAILED DESCRIPTION

Figure 1A:
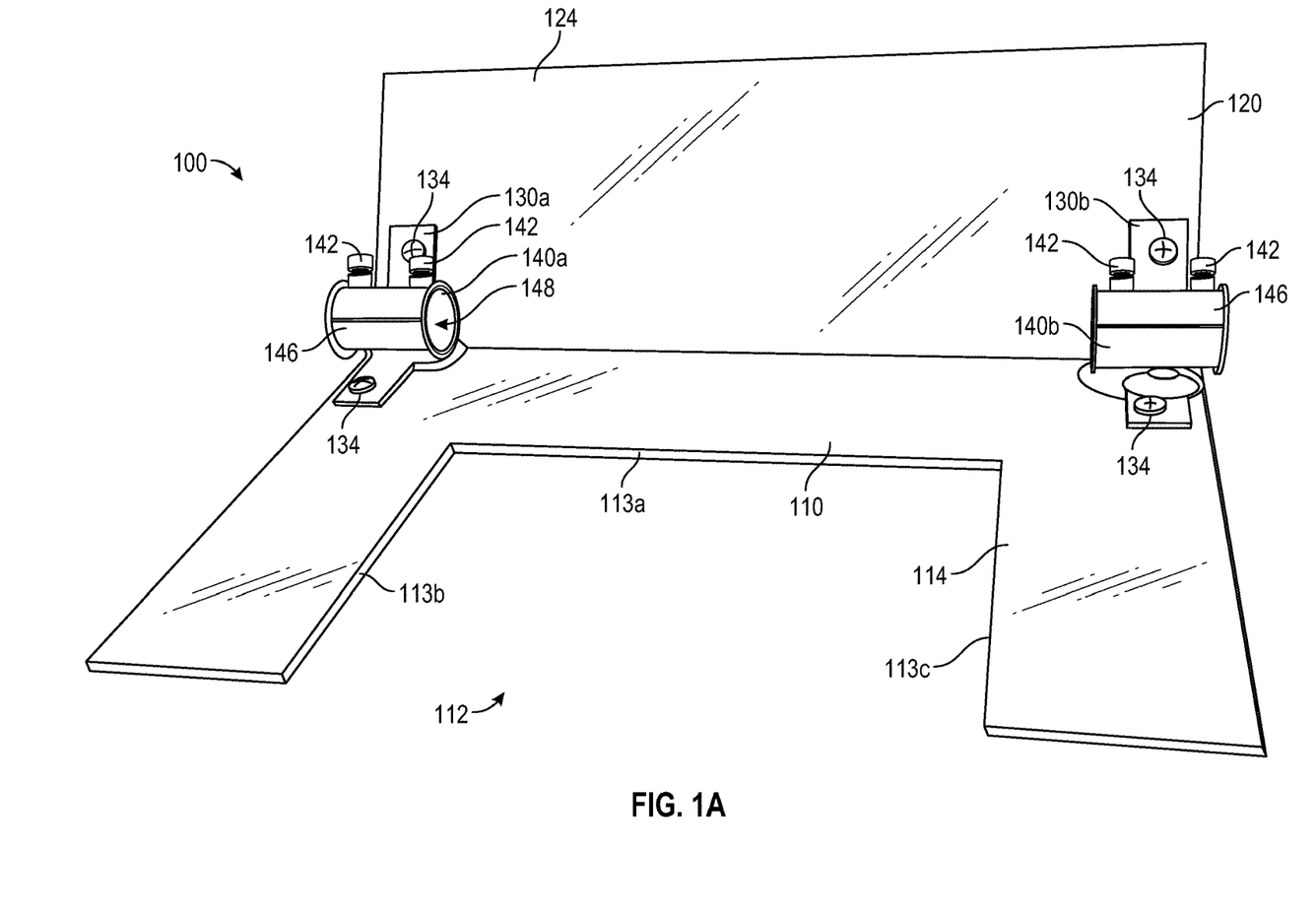
FIGS. 1A-1C illustrate an example implementation of a camera rig according to the principles of the present disclosure.
Figure 1B:
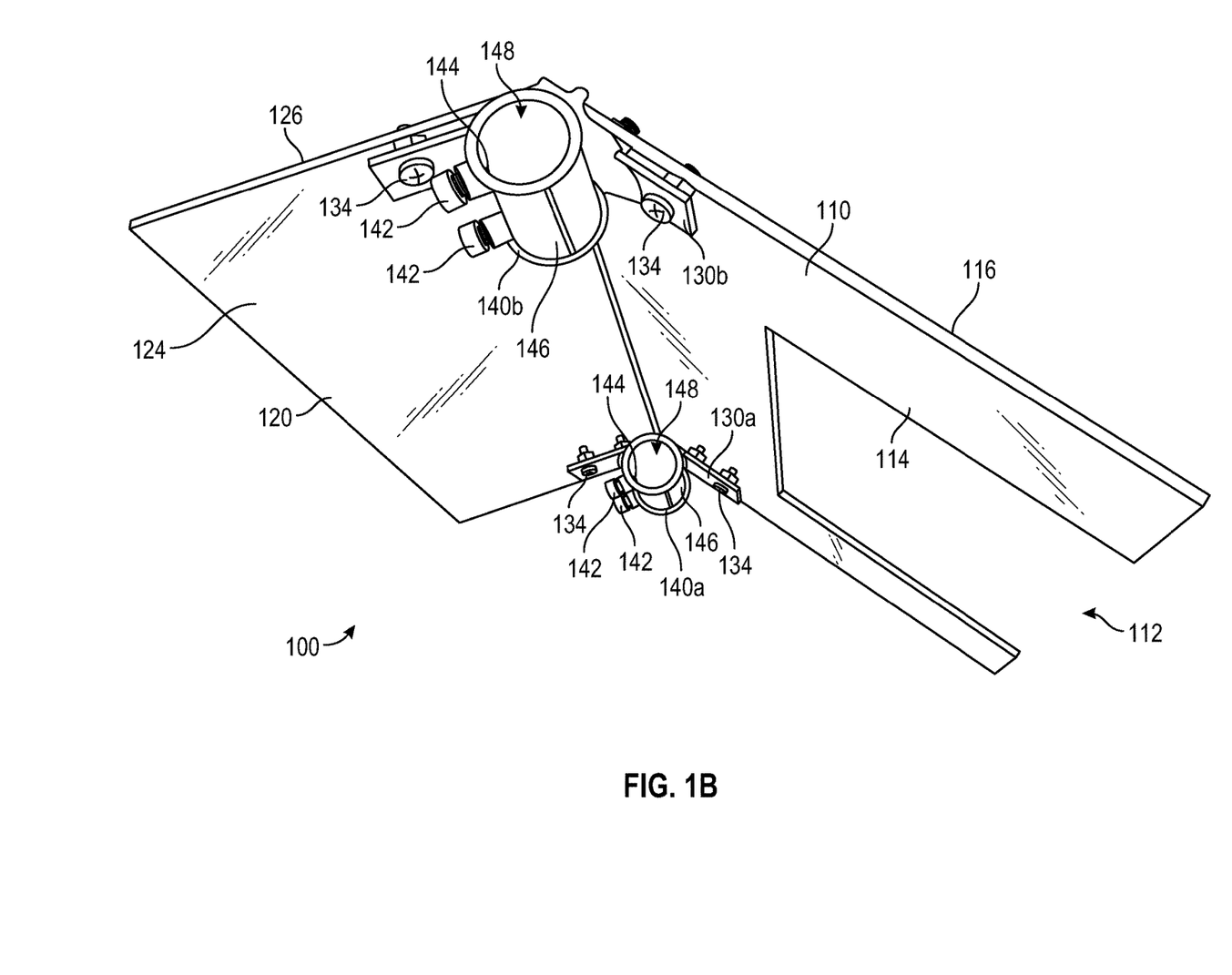
Figure 1C:
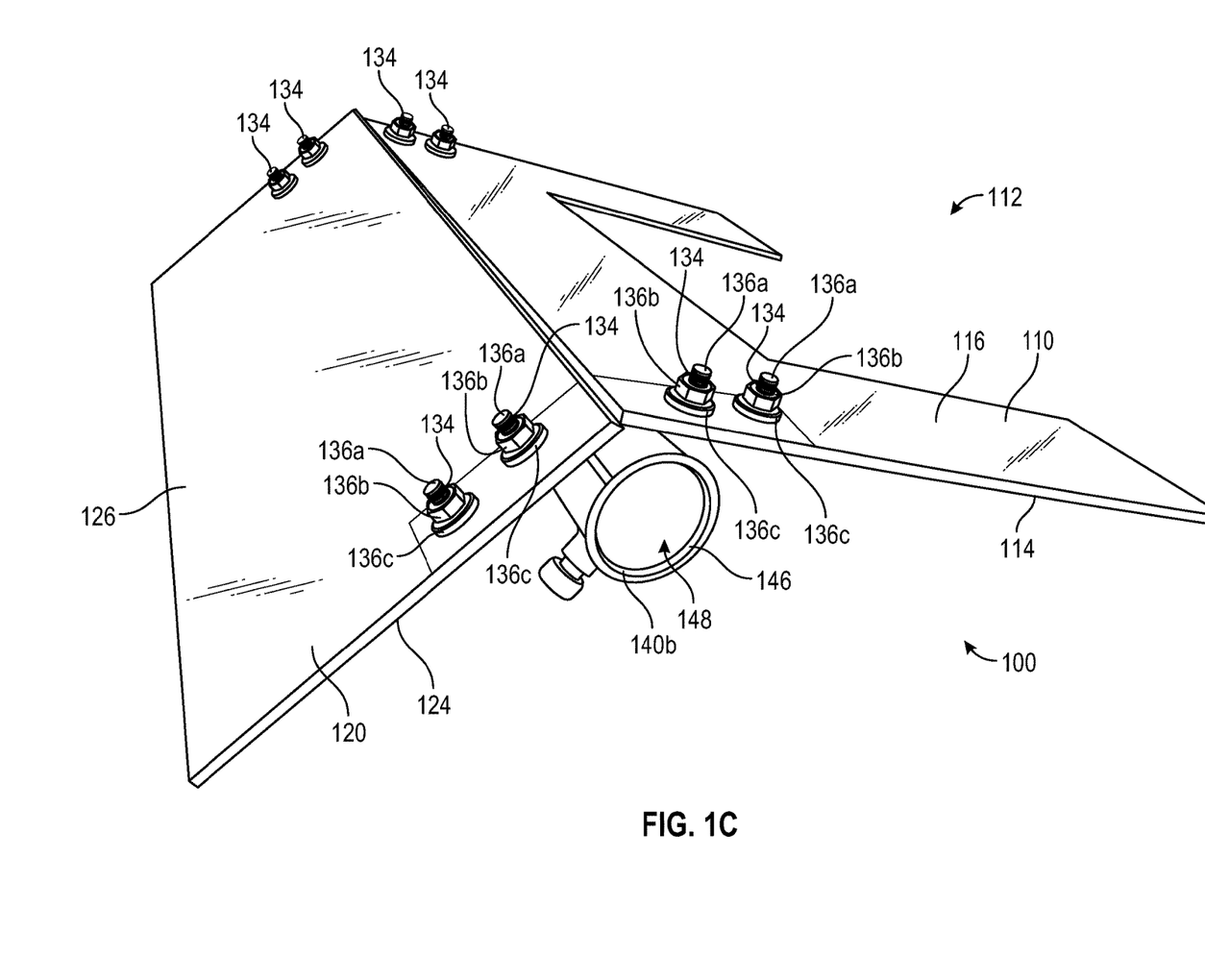

FIGS. 1A-1C illustrate an example camera rig 100. In some implementations, the camera rig 100 may be configured for use in the production of virtual reality (VR) content. In some implementations, the camera rig 100 may be configured so that multiple cameras can be mounted thereon, each mounted camera faces away from the camera rig 100 and provides a different field of view (see, e.g., FIGS. 2, 3A, and 3B). In some implementations, the camera rig 100 may be configured so that cameras 160 mounted thereon are able to capture a scene (e.g., a surgical site) from the perspective of a subject (e.g., a surgeon), without obstructing the subject's view of the scene.

As shown in FIG. 1A, in some implementations, the camera rig 100 may comprise a first planar member 110 and a second planar member 120 connected together by a first angled bracket 130a and a second angled bracket 130b (collectively brackets 130), each angled bracket 130a, 130b may include a connector 140a, 140b (collectively 140). In some implementations, the first planar member 110 and/or the second planar member 120 of the camera rig 100 may be configured so that one or more camera mounts 150 can be used to removably secure one or more cameras 160 thereon (see, e.g., FIGS. 3A and 3B). In this way, multiple cameras 160 may be positioned on the camera rig 100 to capture video (or pictures) used in the production of virtual reality (VR) content.

As shown in FIGS. 1A-1C, in some implementations, the first planar member 110 may comprise a first side 114 (or top side) and a second side 116 (or bottom side), the first side 114 and/or the second side 116 may be configured for a camera mount 150 to be secured thereto. In some implementations, each side 114, 116 of the first planar member 110 may be flat. In this way, the working face of a suction cup may be used to secure a camera mount 150 to either side 114, 116 of the first planar member 110 (see, e.g., FIG. 2).

As shown in FIG. 1A, in some implementations, the first planar member 110 may further comprise a rectangular cutout 112 therein. In some implementations, the cutout 112 may be defined by a first side edge 113a, a second side edge 113b, and a third side edge 113c (collectively side edges 113). In some implementations, the second side edge 113b and the third side edge 113c may extend from a first end and a second end, respectively, of the first side edge 113a. In some implementations, the cutout 112 may be configured (e.g., shaped, dimensioned, etc.) so that the subject can move their head in-between, and/or position their head between, the side edges 113 thereof. In some implementations, the cutout 112 may be configured (e.g., positioned, shaped, dimensioned, etc.) so that the subject has an unobstructed view of at least a portion of the scene being filmed by the cameras 160 mounted on the camera rig 100. In some implementations, the cutout 112 may be any shape suitable for use as part of a camera rig 100.

Figure 2:
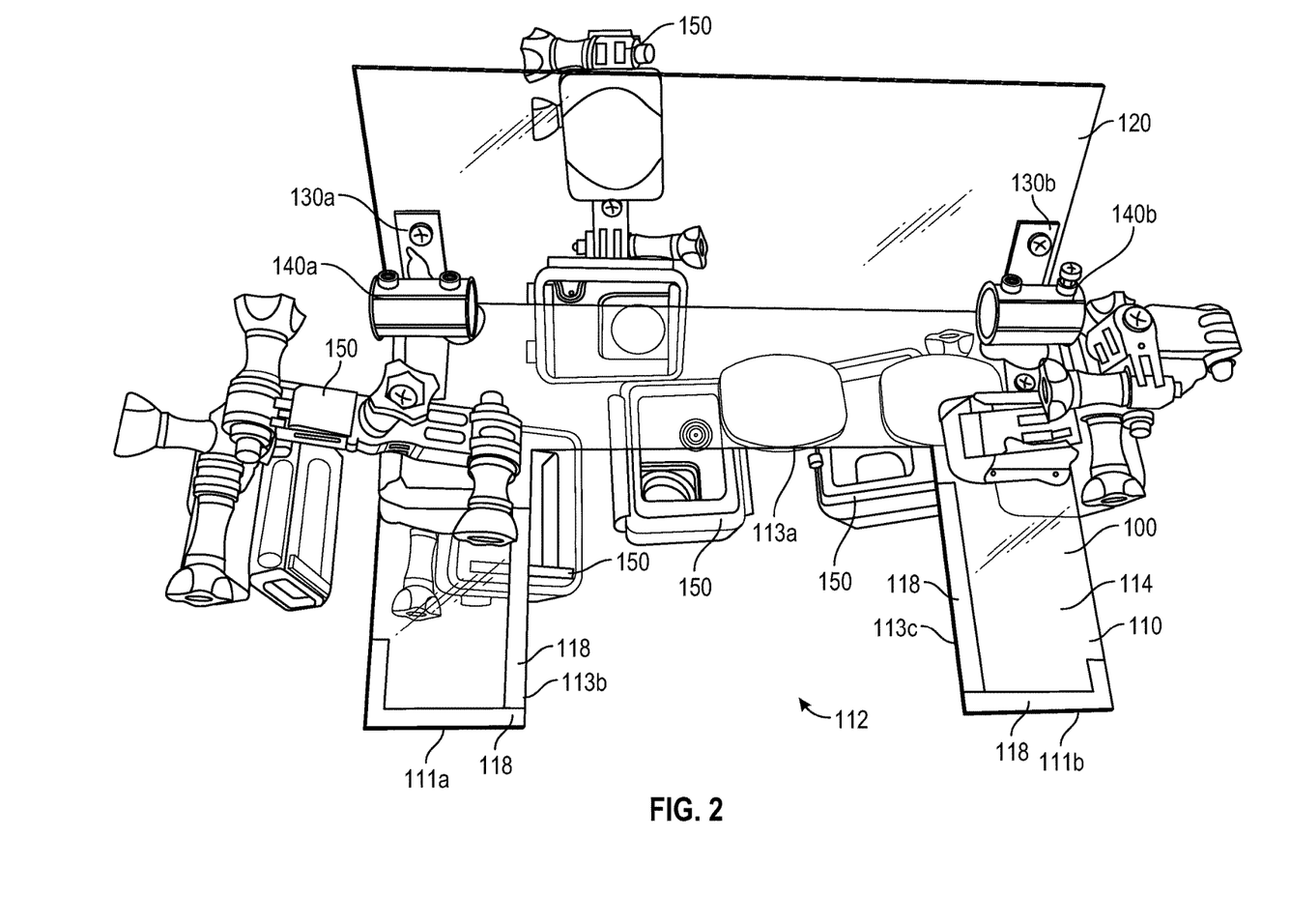
FIG. 2 illustrates the camera rig shown in FIG. 1, wherein multiple cameras are mounted thereon.

As shown in FIG. 2, in some implementations, one or more edges (e.g., the front edges 111a, 111b and/or the side edges 113) of the first planar member 110 may include a visual indicator 118 (e.g., a strip of tape) thereon. In this way, the subject may easily see the one or more edges of the otherwise transparent first planar member 110 and avoid colliding therewith. In some implementations, only a portion of a side edge (e.g., the second side edge 113b and/or the third side edge 113c) of the cutout 112 in the first planar member 110 may include a visual indicator 118 thereon. In this way, the subject may readily see one or more of the edges 113 that define the cutout 112.

In some implementations, a visual indicator 118 may be a strip of tape and/or rubber that is affixed to the one or more edges of the first planar member 110. In some implementations, the visual indicator 110 may be paint that is applied to the one or more edges (e.g., edges 111 and 113) of the first planar member 110 and/or to other portions of the first planar member 110 located adjacent the edges.

In some implementations, a visual indicator 118 may be any visible color. In some implementations, the visual indicator 118 may be one or more primary colors (e.g., red, yellow, blue), or another color generated by additive mixing of the primary colors.

Figure 4A:
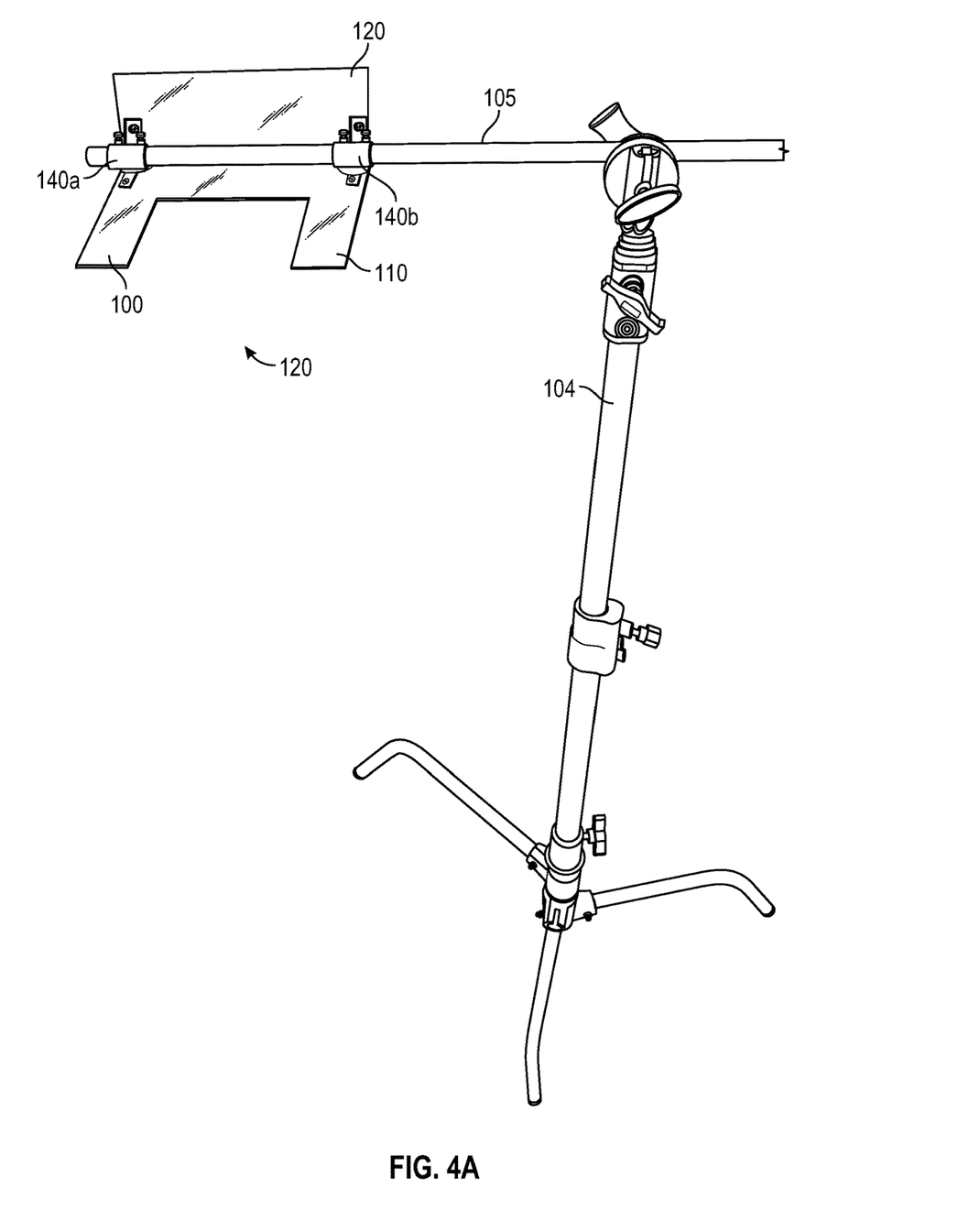
FIGS. 4A-4C illustrate the camera rig, shown in FIGS. 1A-1C, mounted on the arm of a C-stand.
Figure 4B:
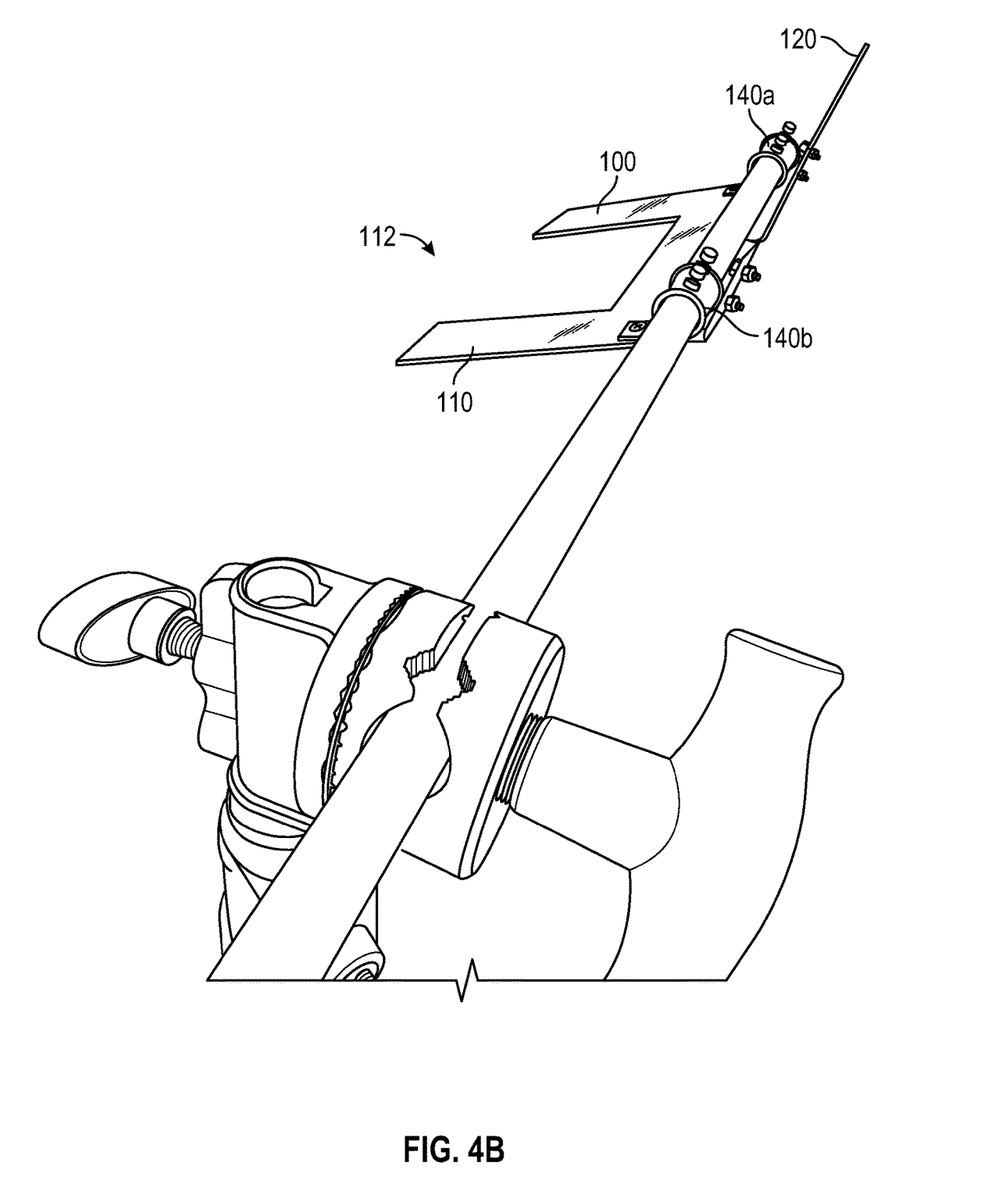
Figure 4C:
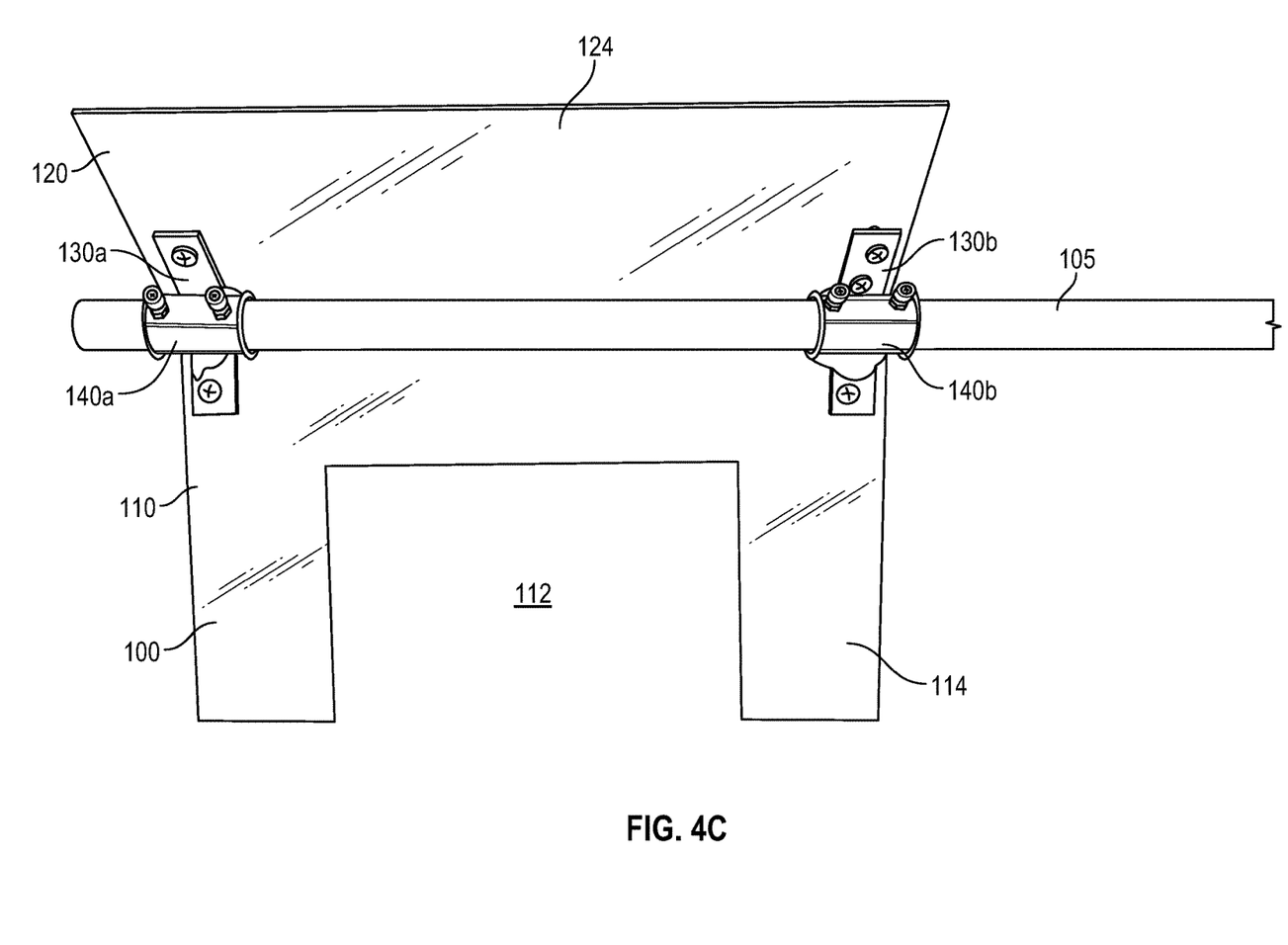

As shown in FIGS. 1A and 4C, in some implementations, the first planar member 110 may have a generally C-shaped profile. In some implementations, the first planar member 110 may be any shape suitable for use as part of a camera rig 100.

As shown in FIGS. 1A-1C, in some implementations, the second planar member 120 may comprise a first side 124 (or posterior side) and a second side 126 (or anterior side), the first side 124 and/or the second side 126 may be configured for a camera mount 150 to be secured thereto. In some implementations, each side 124, 126 of the second planar member 120 may be flat. In this way, the working face of a suction cup may be used to secure a camera mount 150 to either side 124, 126 of the second planar member 120 (see, e.g., FIG. 2).

As shown in FIG. 1A, in some implementations, the second planar member 120 may have a rectangular shape. In some implementations, the second planar member 120 may be any shape suitable for use as part of a camera rig 100.

In some implementations, the first planar member 110 and the second planar member 120 may be fabricated from a transparent material such as acrylic glass (i.e., Poly(methyl methacrylate)). In this way, the camera rig 100 may not obstruct the view of the subject. In some implementations, the first planar member 110 and the second planar member 120 may be fabricated from any translucent material suitable for use as part of a camera rig 100.

As shown in FIGS. 1B, 1C, and 4B, in some implementations, the angled brackets 130 may be configured (e.g., bent, fabricated, etc.) to position the second planar member 120 at an obtuse angle relative to the first side 114 of the first planar member 110. In some implementations, the angled brackets 130 may be configured (e.g., bent, fabricated, etc.) to position the second planar member 120 at a right angle relative to the first side 114 of the first planar member 110.

As shown in FIGS. 1A-1C, in some implementations, four fasteners 134 may be used to secure each angled bracket 130a, 130b to both the first planar member 110 and the second planar member 120 of a camera rig 100. In some implementations, each fastener 134 may comprise a threaded bolt 136a, a threaded nut 136b, and/or a washer 136c (see, e.g., FIG. 1C). In some implementations, more than four fasteners 134, or less than four fasteners 134, may be used to secure each angled bracket 130a, 130b to both the first planar member 110 and the second planar member 120 of a camera rig 100. In some implementations, any fastener suitable for securing an angled bracket 130a, 130b to both the first planar member 110 and the second planar member 120 may be used.

As shown in FIGS. 3A-3B and 4A-4C, in some implementations, the connectors 140 may be configured to secure the camera rig 100 to the arm 105 of a C-stand 104. In some implementations, the connectors 140 may be configured so that the camera rig 100 can be rotated about a C-stand arm 105 prior to being secured thereon. In this way, the camera rig 100 may be oriented and/or positioned over the scene (e.g., a surgical site) to-be recorded by the cameras 160 mounted on the camera rig 100 (see, e.g., FIG. 3B).

As shown in FIG. 1B, in some implementations, each connector 140a, 140b may comprise a housing 146 having a longitudinally extending cylindrical bore 148 therethrough. In this way, a connector 140a, 140b may be able to rotate about the C-stand arm 105. In some implementations, the cylindrical bore 148 of each connector 140a, 140b may be configured to allow at least a portion of a C-stand arm 105 to pass therethrough. In some implementations, the cylindrical bore 148 of the first connector 140a may be in axial alignment with the cylindrical bore 148 of the second connector 140b (see, e.g., FIGS. 3A and 4C). In this way, a single C-stand arm 105 may extend into and/or through both connectors 140 simultaneously.

As shown in FIG. 1B, in some implementations, each connector 140a, 140b may further comprise two threaded fasteners 142 (e.g., screws) that are threadedly engaged with the housing 146 thereof. In some implementations, each connector 140a, 140b may be configured so that the tip 144 of a threaded fastener 142 engaged therewith will press against a C-stand arm 105, positioned within the cylindrical bore 148 thereof, when the threaded fastener 142 is tightened (see, e.g., FIGS. 3A and 3B). In this way, the camera rig 100 may be secured onto the C-stand arm 105. In some implementations, each connector 140a, 140b may include more than two, or less than two, threaded fasteners 142.

In some implementations, the connectors 140 may be configured to secure the camera rig 100 to a length of conduit (not shown). In some implementations, the connectors 140 may be configured to secure a camera rig 100 to any support structure suitable for positioning the camera rig 100 so that cameras 160 mounted thereon are able to capture the scene (e.g., a surgical site) from the perspective of the subject, without obstructing the subject's view of the scene.

In some implementations, the first connector 140a and the second connector 140b may be welded to the first angled bracket 130a and the second angled bracket 130b, respectively. In some implementations, the first connector 140a and the second connector 140b may be secured to the first angled bracket 130a and the second angled bracket 130b, respectively, using any suitable method, technique, and/or fastener known to one of ordinary skill in the art. In some implementations, the first connector 140a and the first angled bracket 130a may be a single unitary piece. In some implementations, the second connector 140b and the second angled bracket 130b may be a single unitary piece.

Figure 3A:
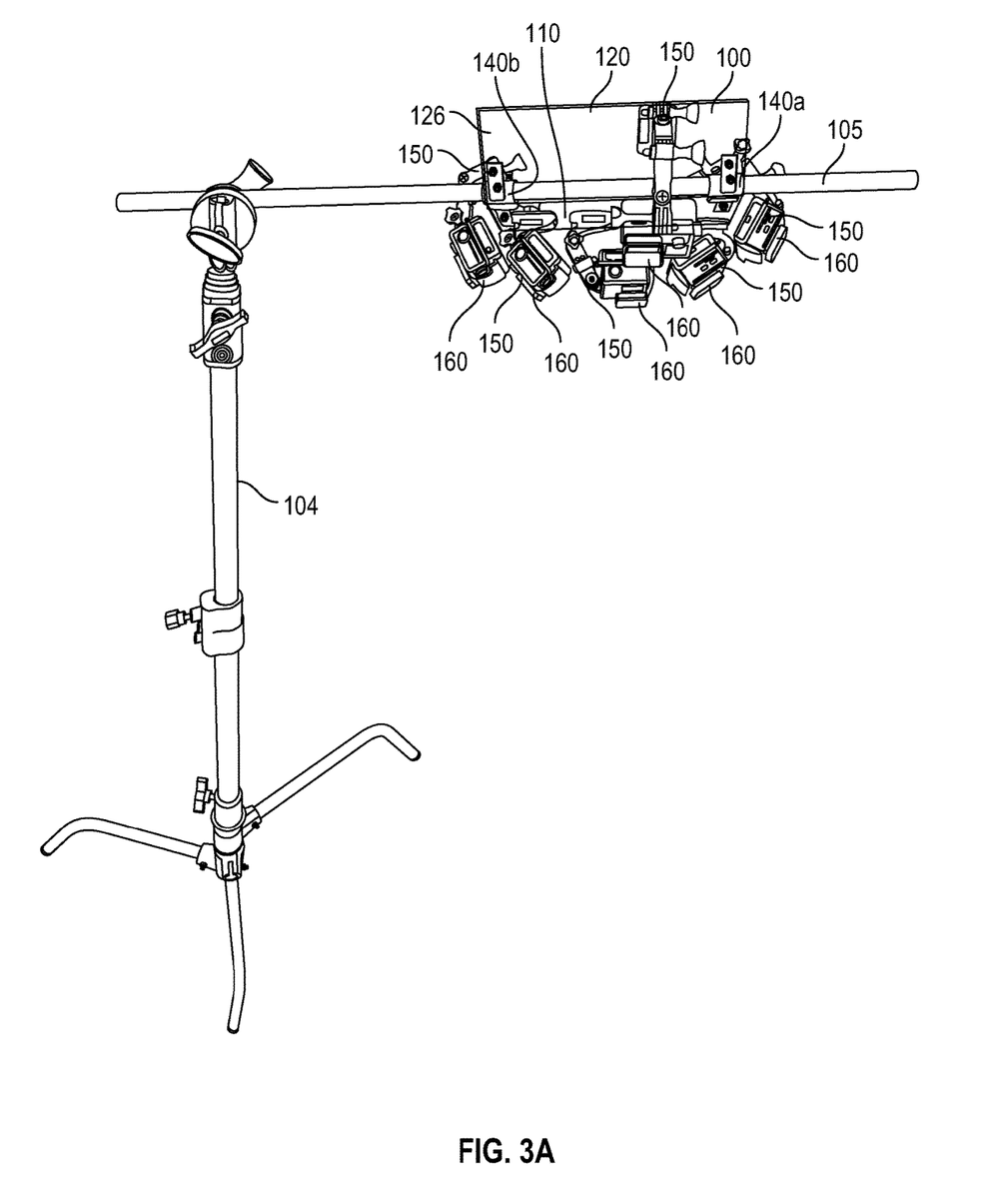
FIGS. 3A-3B illustrate the camera rig shown in FIG. 2, wherein the camera rig is positioned over a scene to-be filmed by the cameras mounted thereon.
Figure 3B:
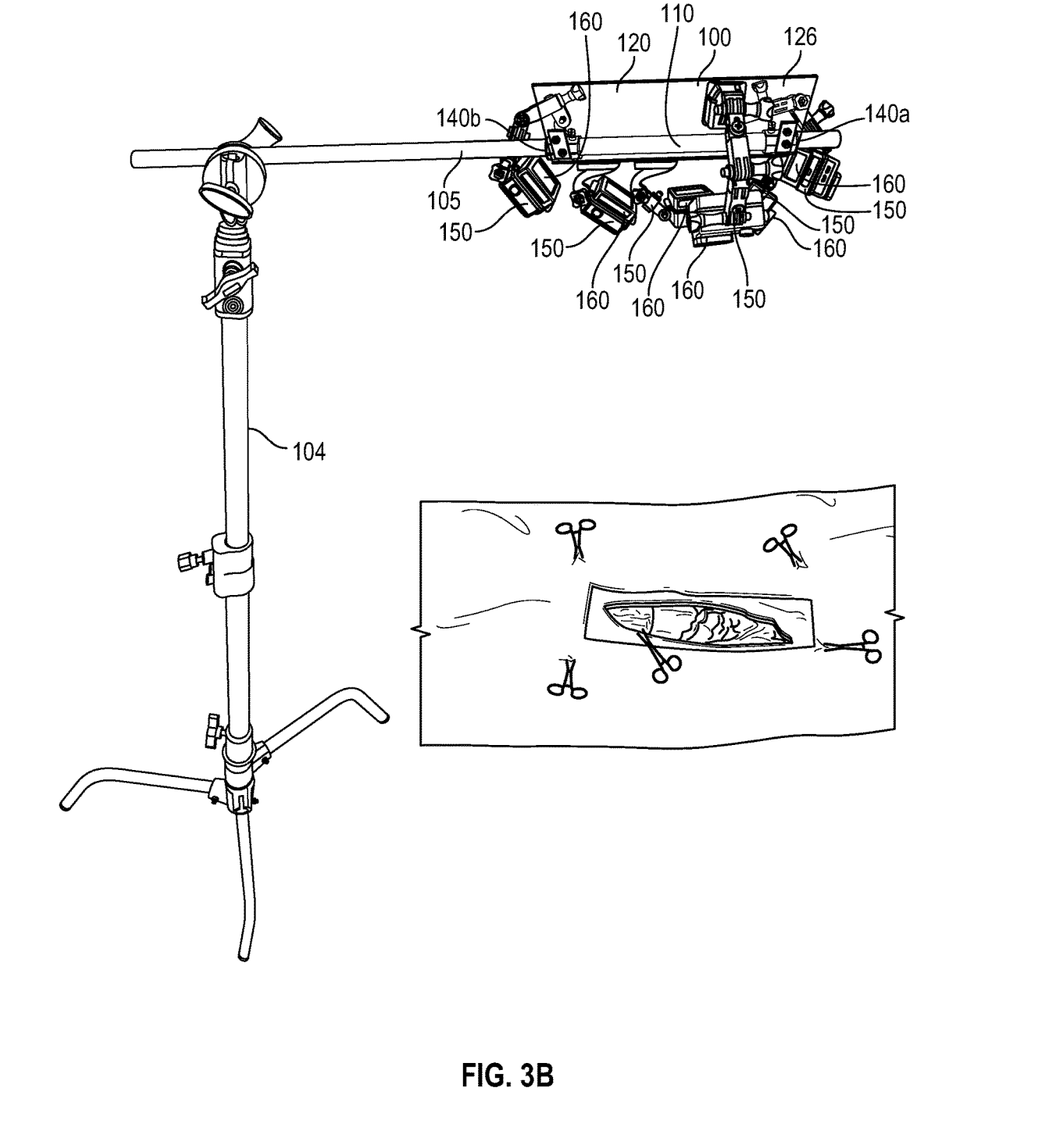

As shown in FIGS. 3A and 3B, in some implementations, the camera rig 100 may be positioned on the arm 105 of a C-stand 104, or other suitable support structure (e.g., a length of conduit), using the following steps. Initially, insert a portion of the C-stand arm 105 through the cylindrical bore 148 of the first connector 140a and the second connector 140b of the camera rig 100.

Then, position the camera rig 100 on the C-stand arm 105 so that the cutout 112 thereof is correctly positioned and/or oriented relative to the scene to-be filmed by the cameras 160 mounted on the camera rig 100 (see, e.g., FIG. 3B).

Next, tighten each threaded fastener 142 that is threadedly engaged with the housing 146 of the first connector 140a and the second connector 140b until the tip 144 thereof is pressed against the C-stand arm 105. The threaded fasteners 142 should be tightened until the tips 144 thereof are placing sufficient force on the C-stand arm 105 to prevent the unintended movement of the camera rig 100.

In some implementations, the camera rig 100 may be removed from the C-stand arm 105 by performing the above steps in reverse order.

In some implementations, two C-stands may be used to support a single camera rig 100. In this way, a camera rig 100 that weighs enough to topple a single C-stand 104 can still be used in the production of virtual reality (VR) content. For example, in some implementations, the first connector 140a of the camera rig 100 may be secured onto the arm of a first C-stand and the second connector 140b may be secured onto the arm of a second C-stand.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A camera rig configured for use in the production of virtual reality content, the camera rig comprising:
    a first planar member and a second planar member connected together by a first angled bracket and a second angled bracket, the first angled bracket includes a first connector and the second angled bracket includes a second connector;
    wherein the first planar member comprises a first side, a second side, and a cutout therein, both the first side and the second side of the first planar member are configured so that a camera mount can be secured thereon, and the cutout is configured so that a subject can position at least a portion of their head therein when the camera rig is in use;
    wherein the second planar member comprises a first side and a second side, both the first side and the second side of the second planar member are configured so that a camera mount can be secured thereon;
    wherein the first planar member and the second planar member are fabricated from a transparent material; and
    wherein the first connector and the second connector are configured to secure the camera rig to a support structure that is configured to position the camera rig over a scene to-be captured by one or more cameras mounted thereon.

2. The camera rig of claim 1, wherein the first connector and the second connector each comprise a housing having a longitudinally extending cylindrical bore therethrough, the cylindrical bore of the first connector is in axial alignment with the cylindrical bore of the second connector, thereby allowing an appropriately configured portion of the support structure to extend through both connectors.

3. The camera rig of claim 1, wherein the first angled bracket and the second angled bracket are configured to position the second planar member at an obtuse angle relative to the first side of the first planar member.

4. The camera rig of claim 1, wherein the first angled bracket and the second angled bracket are configured to position the second planar member at a right angle relative to the first side of the first planar member.

5. The camera rig of claim 1, wherein the cutout in the first planar member is defined by a first side edge, a second side edge that extends from a first end of the first side edge, and a third side edge that extends from a second end of the first side edge.

6. The camera rig of claim 5, wherein at least one of the side edges of the cutout in the first planar member include a visual indicator thereon.

7. The camera rig of claim 1, wherein one or more edges of the first planar member include a visual indicator thereon.

8. A camera rig configured for use in the production of virtual reality content, the camera rig comprising:
    a first planar member and a second planar member connected together by a first angled bracket and a second angled bracket, the first angled bracket includes a first connector and the second angled bracket includes a second connector;
    wherein the first planar member comprises a first side, a second side, and a cutout therein; both the first side and the second side of the first planar member are configured so that a camera mount can be secured thereon; and the cutout is defined by a first side edge, a second side edge that extends from a first end of the first side edge, and a third side edge that extends from a second end of the first side edge;
    wherein the second planar member comprises a first side and a second side, both the first side and the second side of the second planar member are configured so that a camera mount can be secured thereon;
    wherein the first planar member and the second planar member are fabricated from a transparent material; and
    wherein the first connector and the second connector are configured to secure the camera rig to a support structure that is configured to position the camera rig over a scene to-be captured by one or more cameras mounted thereon.

9. The camera rig of claim 8, wherein the first connector and the second connector each comprise a housing having a longitudinally extending cylindrical bore therethrough, the cylindrical bore of the first connector is in axial alignment with the cylindrical bore of the second connector, thereby allowing an appropriately configured portion of the support structure to extend through both connectors.

10. The camera rig of claim 9, wherein the first angled bracket and the second angled bracket are configured to position the second planar member at an obtuse angle relative to the first side of the first planar member.

11. The camera rig of claim 10, wherein at least one of the side edges of the cutout in the first planar member include a visual indicator thereon.

12. The camera rig of claim 9, wherein the first angled bracket and the second angled bracket are configured to position the second planar member at a right angle relative to the first side of the first planar member.

13. The camera rig of claim 12, wherein at least one of the side edges of the cutout in the first planar member include a visual indicator thereon.

14. The camera rig of claim 8, wherein one or more edges of the first planar member include a visual indicator thereon.

* * * * *